United States Patent [19]

Hasegawa

[11] Patent Number: 4,965,440
[45] Date of Patent: Oct. 23, 1990

[54] INFORMATION REPRODUCING APPARATUS

[75] Inventor: Kouyo Hasegawa, Tokyo, Japan

[73] Assignee: Canon Kabushiki Kaisha, Tokyo, Japan

[21] Appl. No.: 414,573

[22] Filed: Sep. 29, 1989

Related U.S. Application Data

[63] Continuation of Ser. No. 942,619, Dec. 17, 1986, abandoned.

[30] Foreign Application Priority Data

Dec. 19, 1985 [JP] Japan .................. 60-284228

[51] Int. Cl.$^5$ .............................. G06F 7/00
[52] U.S. Cl. .................. 235/487; 235/435; 360/2
[58] Field of Search ............ 360/2, 131; 235/435, 235/439, 487, 490, 491, 492, 493, 494

[56] References Cited

U.S. PATENT DOCUMENTS

| 3,826,900 | 7/1974 | Moellering | 235/435 |
| 3,849,632 | 11/1974 | Eckert, Jr. et al. | 235/435 |
| 4,007,547 | 2/1977 | Butler et al. | 360/2 |
| 4,027,405 | 6/1977 | Schloss | 360/2 |
| 4,554,591 | 11/1985 | Kee | 360/2 |

FOREIGN PATENT DOCUMENTS

| 2493569 | 5/1982 | France . |
| 607189 | 11/1978 | Switzerland . |
| 1008707 | 11/1965 | United Kingdom . |
| 2020467 | 11/1979 | United Kingdom . |
| 2141274 | 12/1984 | United Kingdom . |

OTHER PUBLICATIONS

"Etude et Realisationd'un Lecteur Optique de Relief Braille avec Transcription Automatique en Texte 'noir'", J.P. duBus, et al., L'Onde Electrique, vol. 65, No. 3, May-Jun. 1985, pp. 58-70.

Primary Examiner—A. D. Pellinen
Assistant Examiner—Jeffrey A. Gaffin
Attorney, Agent, or Firm—Fitzpatrick, Cella, Harper & Scinto

[57] ABSTRACT

An information reproducing apparatus has an information reading device for reading first information (for example, image information) from an information recording carrier, a converter for converting the first information into second information (for example, sound information), a first output element for outputting the first information as a particular mode of information (for example, an image), and a second output element for outputting the second information as information in a particular mode (for example, a sound).

5 Claims, 3 Drawing Sheets

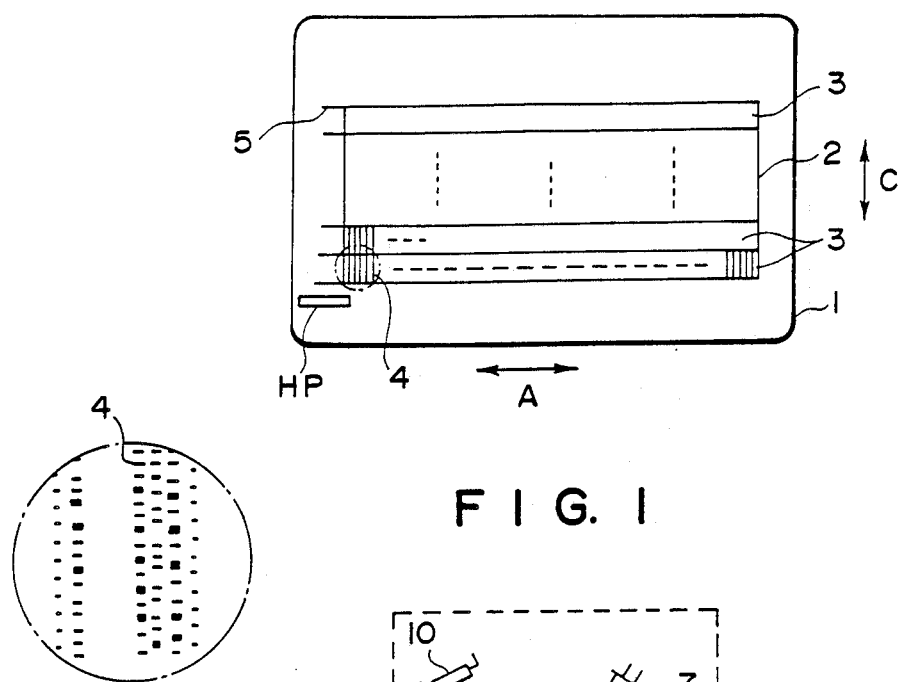
FIG. 1
FIG. 1A
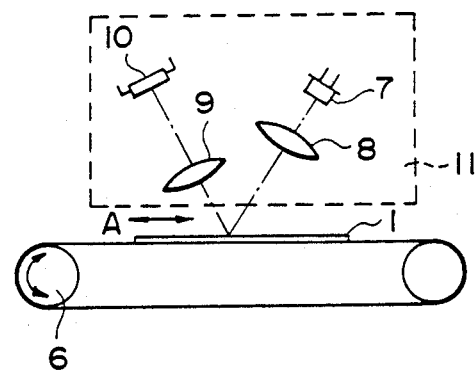
FIG. 2
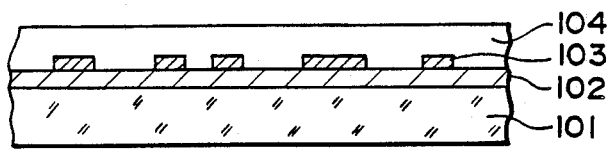
FIG. 3

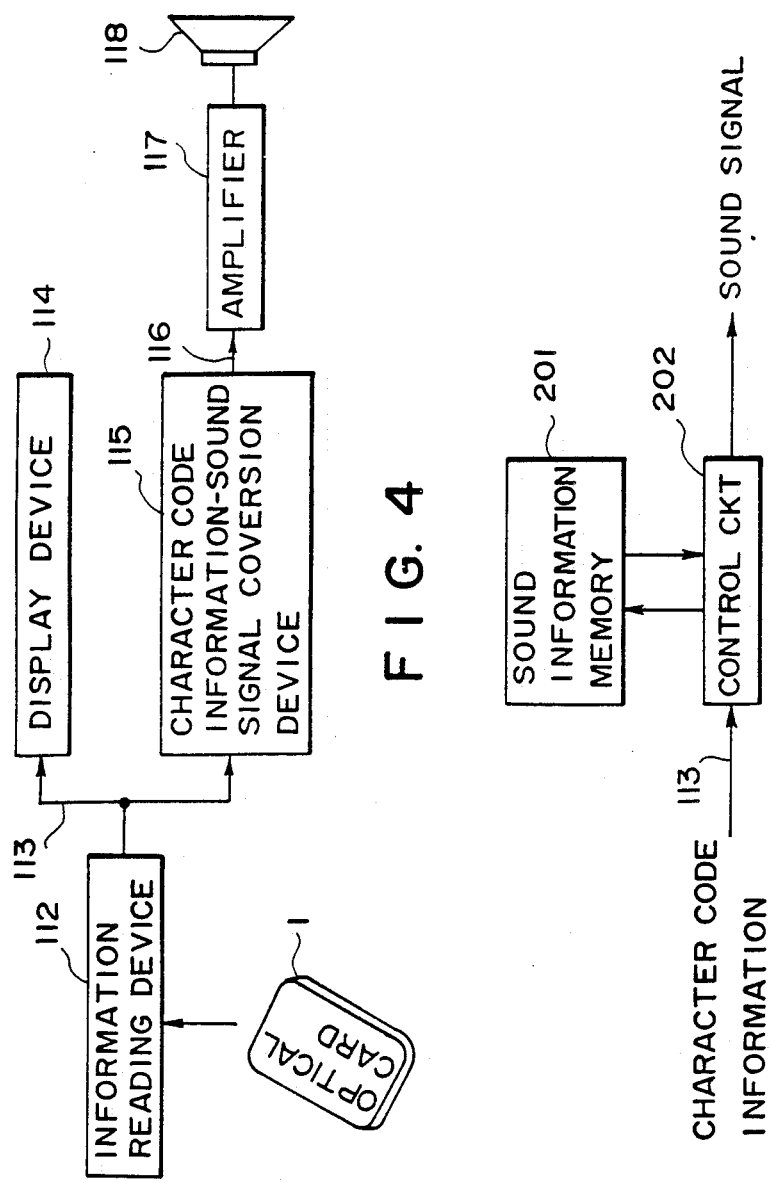

INFORMATION REPRODUCING APPARATUS

This application is a continuation of application Ser. No. 06/942,619 filed Dec. 17, 1986 now abandoned.

BACKGROUND OF THE INVENTION

1. Field of the Invention

This invention relates to an information reproducing apparatus, and in particular to an information reproducing apparatus having an information reading device for reading information from an information recording carrier, a display device for displaying characters by the use of such information, and a sound producing device for producing sounds by the use of said information. This invention also relates to an information reproducing apparatus which can be suitably used by infants, the blind or aurally handicapped persons.

2. Description of the Prior Art

Apparatuses of this type have heretofore used a magnetic card memory, a floppy disc memory, a video disc memory, a magnetic tape memory or the like as an information recording carrier, a CRT display, a flat display or the like as a character display device, and a speaker or the like as a sound producing device.

As a character reproducing method, characters are converted into character code information and recording thereof is effected, and the character code information is read out and display thereof is effected on the character display device. Also, as a sound reproducing method, original sound signals are A/D (analog-digital) converted, whereafter digital signals subjected to band compression are recorded and read out, and then demodulation and D/A (digital-analog) conversion are effected, whereby the digital signals are made into sound signals, which in turn are reproduced by the sound reproducing device. According to the prior-art information reproducing method, both the character information and the sound information are recorded on an information recording carrier, and in such a construction, the amount of information after original sound signals have been A/D (analog-digital) converted is at least 3-4 kilobytes/sec., and to record lengthy sound information, a memory of very great capacity if required. Also, as regards to the number of displayed characters, a very great capacity is required where character code information for a long document or for a large number of documents is to be recorded.

However, in magnetic card memories heretofore generally used, the recording capacity is as small as about 100 bytes and for example, lengthy sound information and character code information cannot both be record at the same time.

Further, not only magnetic card memories but also other various memories have been limited in recording capacity by the size thereof and the recording system, and the amount of information obtained during reproduction has been limited.

SUMMARY OF THE INVENTION

It is an object of the present invention to provide, in view of the above-noted problems peculiar to the prior art, an information reproducing apparatus which can derive, for reproduction, formation in various output formats from the information stored in an information recording carrier.

It is a further object of the present invention to provide an information reproducing apparatus which can be suitably used by the blind, aurally handicapped persons or the like.

To achieve the above objects, the information reproducing apparatus according to the present invention has an information reading device for reading first information from an information recording carrier, converting means for converting the first information into second information, first output means for outputting the first information as a particular mode of information, and second output means for outputting the second information as a particular mode of information.

To achieve said further object, a form of the information reproducing apparatus according to the present invention has a reading device for reading image information from an information recording carrier containing the image information, information converting means for converting the image information into sound information, display means for displaying an image on the basis of the image information, and sound producing means for outputting a sound on the basis of the sound information.

To achieve said further object, another form of the information reproducing apparatus according to the present invention has a reading device for reading sound information from an information recording carrier containing the sound information, information converting means for converting the sound information into image information, sound producing means for outputting a sound on the basis of the sound information, and display means for displaying an image on the basis of the image information.

These and other objects, features and advantages of the present invention will be more fully appreciated from the following detailed description of the preferred embodiments of the present invention, taken together with the accompanying drawings.

BRIEF DESCRIPTION OF THE DRAWINGS

FIG. 1 is a schematic plan view showing an information recording carrier from which information is reproduced by the information reproducing apparatus and showing example of the recording format of an optical memory card.

FIG. 1A is a detail thereof.

FIG. 2 is a schematic view showing an information reading device for reading information from the optical memory card shown in FIG. 1.

FIG. 3 is a cross-sectional view showing the structure of the optical memory card shown in FIG. 1.

FIG. 4 is a block diagram showing an embodiment of the information reproducing apparatus according to the present invention.

FIG. 5 is a block diagram showing a specific example of the character code information-sound signal conversion device in the block diagram of FIG. 4.

FIG. 6 is a block diagram showing another embodiment of the information reproducing apparatus according to the present invention.

DESCRIPTION OF THE PREFERRED EMBODIMENTS

Figure 7:
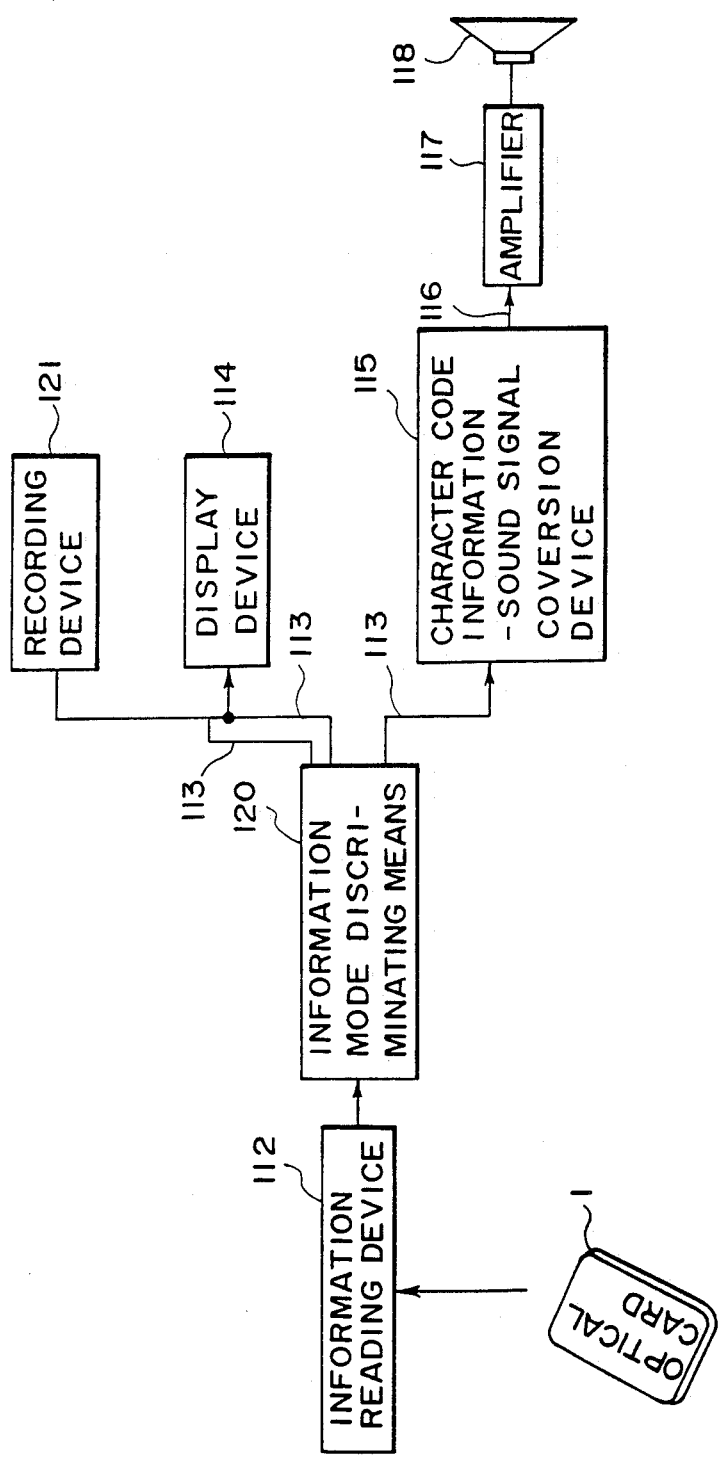
FIG. 7 is a block diagram showing an application of the information reproducing apparatus shown in FIG. 4.

Some embodiments of the present invention will hereinafter be described in detail with reference to the drawings. Information reproducing apparatuses using optical cards will be described as embodiment of the information reproducing apparatus of the present invention.

FIG. 1 is a schematic plan view showing the recording format of an optical card.

In FIG. 1, reference numeral 1 designates an optical card which is an information recording carrier, reference numeral 2 denotes an information recording area, reference numeral 3 designates bands comprising a plurality of tracks, reference numeral 4 denotes information tracks, and reference numeral 5 designates an identifying area for separating the bands 3.

In FIG. 1, the recording area 2 is provided on the optical card 1, and the bands 3 are arranged and formed in the recording area 2. The bands 3 are formed of the information tracks 4 and a number of start bits and stop bits, and the information tracks 4 have an information capacity of the order of several tens to 100 bits. The bands are partitioned by reference lines (hereinafter referred to as the R lines). Arrow A indicates the directions of movement of the optical card during reproduction.

In the system of the present invention, it is not often that only one track is accessed, but to facilitate the control of information, access is usually effected for each minimum access unit (usually called a sector or a block) comprising a plurality of tracks.

Accordingly, groups of tracks each comprising a plurality of tracks are usually formed, and identifying areas for distinguishing between the groups of tracks are provided between the group of tracks, and access is effected with the groups of tracks as the minimum a unit.

The optical card, may be a recording carrier such as a magneto-optical recording carrier in which the direction of magnetization is reversed or an information recording carrier using concavo-convex pits, but usually use is widely made of an information recording medium utilizing the pitch of optical reflectivity which is easy to manufacture.

FIG. 3 shows a cross-section of the optical card. Such optical card can be easily made as by evaporating a low-reflectivity metal 102 such as Te onto a substrate 101 having a thickness of 100 $\mu$m, placing a mask of the aforementioned format thereon, and evaporating a high-reflectivity metal 103 such as Cu thereonto. Also, for the purpose of protection, an optically transparent laminate layer 104 having a thickness of several hundred $\mu$m is usually bonded to the optical card. Information to be recorded on the optical card is not limited to character code information, but may also be image information or sound information.

FIG. 2 schematically shows the construction of an information reading device for the optical card shown in FIG. 1.

In FIG. 2, the optical card 1 is movable in the directions of arrow A by a rotating mechanism 6. The information recorded on the optical card 1 is read on each information track 4 by an optical head 11. The light from a light source 7 such as LED is first condensed by a lens system 8, and the information track 4 on which the information is recorded is illuminated. The image of the information track 4 thus illuminated is formed on a sensor array 10 by an imaging optical system 9, and an electrical signal corresponding to the information recorded on the information track 4 is output from the sensor array 10. When the reading of the information track 4 is completed, the optical card 1 is moved in the directions of arrow A and the optical head 11 is moved in the directions of arrangement of the band 3 (the directions of arrow C), and the reading of the information on the next information track is effected in the same manner as described above. To access any track on the optical card 1, the optical head is first moved in the directions of arrow C with the home position HP as the reference. The optical head 11 counts the R lines 5, thereby selecting a band 3 to which the desired track which is to be read belongs, and is stopped upon arrival at said band. Subsequently, the optical card 1 is moved in the directions of arrow A by the rotating mechanism 6, and when movement of the optical card brings the desired track into the proper position relative to the head, reading of the information in that track is effected.

FIG. 4 is a block diagram showing an embodiment of an information reproducing apparatus according to the present invention.

In FIG. 4, reference numeral 1 designates an optical card as shown in FIG. 1, reference numeral 112 denotes an information reading device as shown in FIG. 2, and reference numeral 113 designates the information read out by the information reading device 112 from optical card 1, where it has previously been stored in a predetermined form. Here, it is to be understood that the information is character code information comprising numerals, Japanese cursive letters, square Japanese letters, Chinese characters, alphabetical letters, symbols, figures, etc. Reference numeral 114 denotes a display device for displaying characters on the basis of the character code information 113, reference numeral 115 designates an character code information-sound signal conversion device for converting the character code information 113 into a sound signal 116, reference numeral 117 denotes an amplifier for amplifying the electrical signal forming the sound information, and reference numeral 118 designates a speaker for outputting sounds on the basis of the sound information.

By inserting the optical card 1 into the information reading device 112, the information reading device 112 reads the information in the optical card 1 and outputs the character code information 113 to the character display device 114 and the character code information-sound signal conversion device 115. The character display device 114 displays characters corresponding to the character code information 113, the character code information-sound signal conversion device 115 outputs the sound signal 116 corresponding to the character code information 113, and sounds are produced from the amplifier 117 and speaker 118 which are a sound producing device.

FIG. 5 is a block diagram of the character code information-sound signal conversion device shown in the block diagram of FIG. 4.

The character code information-sound signal conversion device 115 comprises a sound information memory 201 and a control circuit 202. The control circuit 202 which has received the character code information selects the sound information corresponding to the character code information (which sound information signal is equal to a digital signal obtained by A/D-converting an original sound signal and applying band compression thereto) from the sound information memory 201, demodulates and D/A-converts the sound information signal and outputs it as a sound signal. The character code information-sound signal conversion device is not restricted to such type, but may be of a type in which, as a result, a sound signal output is obtained for a character code information input.

Plural types of character code information (for example, Chinese characters and figures) may be recorded on the optical card, and may be displayed by the use of display devices corresponding to the respective types of character code information, and explanation of one or both of them may be effected in the form of sound.

According to the information reproducing apparatus described above with reference to FIGS. 4 and 5, character information 113 and sound information 116 can be obtained from the character information recorded on the optical card 1.

Also, in the information reproducing apparatus of the above-described embodiment, in spite of the information recorded on the optical card 1 being character information, said information can be obtained as a sound corresponding to the character information and therefore, even if the owner of the information recording carrier such as the optical card is a blind person, he or she can know the information stored in the carrier. This benefit also can be obtained by those who cannot read, by small children, etc.

In the above-described embodiment, the optical card 1 has been used as the information recording carrier. However, the information recording carrier applicable to the apparatus of the present invention is not limited to the optical card 1, but may be any of various recording carriers such as an optical or magnetic or magneto-optical disc, or a magnetic or optical tape.

Accordingly, the information reading device also may assume various forms depending on the type of the information recording carrier and the type of the information recording.

When portability, recording capacity, etc. are taken into account, the optical card 1 as shown in FIG. 1 is considered to be a suitable information recording carrier.

The display device 114 in the block diagram of FIG. 4 is directed to the display of CRT or the like. Herein, the display device 114 is used to make the handler of the information reproducing apparatus (or the owner of the optical card 1) recognize the information in the optical card 1, but for example, a recording apparatus such as a printer may be used to record the information in the optical card 1 on a predetermined sheet of recording paper.

FIG. 6 is a block diagram of another embodiment of the information reproducing apparatus of the present invention. In FIG. 6, portions identical to those in FIG. 4 are given identical reference numerals and description thereof is omitted.

In FIG. 6, the information reading device 112 outputs sound information 110 recorded in the optical card 1 to a sound information-character code information conversion device 111 and a sound information-sound signal conversion device 119. The sound information-character code information conversion device 111 outputs character code information 113 to the character display device 114. The sound information-sound signal conversion device 119 outputs a sound signal 116 to the amplifier 117. The sound information 110 is equal to a digital signal obtained by A/D-converting an original sound signal and applying band compression thereto, and in the sound information-sound signal conversion device 119, this sound information 110 is demodulated and D/A (digital-analog) converted and output as the sound signal 116. The sound information-character code information conversion device 111 converts the sound information 110 into character code information 113 by sound recognizing means or the like and outputs the same.

FIG. 7 is a block diagram showing an application of the invention reproducing apparatus shown in FIG. 4. In FIG. 7, portions identical to those in FIG. 4 are given identical reference numerals and description thereof is omitted.

In the present embodiment, it is to be understood that discrimination information for distinguishing whether the owner of the optical card 1 is a normal person or a blind person or a person who cannot read is recorded in the form of a mark or indicium in the optical card 1.

By inserting the optical card 1 into the information reproducing apparatus 112 reads the information in the optical card 1. This information includes the aforementioned discrimination information and is once input to information mode discriminating means 120.

The information mode discriminating means 120, on the basis of the aforementioned discrimination information, selects a device and/or means to which the character code information 113 is to be input. For example, if the discrimination information is information indicative of a blind person, the character code information 113 will be output to only the character code information-sound signal conversion means 115 or output to the information-sound signal conversion means 115 and display device 114 or recording device 121. On the other hand, if the discrimination information is information indicative of a normal person or there is no information indicative of a blind person, the character code information 113 is output to the recording device 121 and/or the display device 114.

The foregoing embodiments have been described with respect to an information reproducing apparatus suitable for blind persons, but the information mode discriminating means 120 shown in FIG. 7 can be used in the following form.

For example, in the block diagram of FIG. 7, a system having the conversion devices 111 and 119 shown in FIG. 6 is added to the system subsequent to the information mode discriminating means 120. Here, whether the information read from the optical card 1 by the information reading device 112 is character code information or sound information is discriminated by the information mode discriminating means 120. If the read information is character code information, the information is output to the system shown in the block diagram of FIG. 4, and if the read information is sound information, the information is output to the system shown in the block diagram of FIG. 6.

As described above, by the information reproducing apparatus being endowed with the information mode discriminating function, it becomes possible to output the read information in any output form or in any information mode in conformity with the mode and type of the information stored in the information recording carrier, or with the owner of the information reproducing apparatus. By constructing such a system, it will become unnecessary to drive the output devices and conversion means of the information reproducing apparatus at all times. Also, the output form is selected automatically, and this leads to the possibility of providing a highly versatile information reproducing apparatus.

In the above-described embodiments, the case where the information indicative of the mode of the information possessed by the information recording carrier such as the optical card 1 and of the owner of the carrier is recorded in the carrier has been shown, but a form may also be adapted in which the information of such type is input to the information reproducing apparatus, for example, through input means present in the information reading device.

The information reproducing apparatus of the present invention can be used in various information preserving and retrieving systems because it can substantially increase the amount of information recorded on the information recording carrier. Also, the apparatus of the present invention can be utilized as a reading machine for the blind because, in this apparatus, character information is converted into sound information. Also for normal persons, it can very conveniently be used as a so-called reciting machine. It is also suitable as a sound information reproducing apparatus for aurally handicapped persons because, in it, sound information can conversely be converted into character information.

The information reproducing apparatus of the present invention eliminates, for example, the necessity of providing plural types of recording areas such as character information and sound information areas in the information recording carrier and can record one of the plural types of information in a great quantity and moreover, reproduced information provides plural types of information. Accordingly, the recording area of the information recording carrier can be used efficiently.

I claim:

1. An information reproducing apparatus comprising:
   information reading means for reading predetermined information recorded on an information recording carrier;
   first output means for outputting said predetermined information read by said information reading means in a first form;
   second output means for outputting said predetermined information read by said information reading means in a second form different from said first form; and
   output selecting means for selecting the forms for outputting from said first and second output means based upon said predetermined information read by said information reading means, wherein said predetermined information includes discrimination information recorded on said information recording carrier for use in determining which of said first and second output means should be selected, and wherein said information reading means reads said discrimination information, and said output selecting means selects the forms for outputting based upon said discrimination information read by said information reading means.

2. An apparatus according to claim 1, wherein said first output means outputs said predetermined information in the form of a character display.

3. An apparatus according to claim 2, wherein said second output means outputs said predetermined information in the form of voice sound.

4. An apparatus according to claim 3, wherein said output selecting means selects to output by use of at least said second output means in a case in which there is information, in said predetermined information, indicating that a user is blind.

5. An apparatus according to claim 4, wherein said output selecting means selects not to output by use of said first output means in a case in which there is information, in said predetermined information, indicating that a user is blind.

* * * * *